(12) United States Patent
Ryu

(10) Patent No.: US 8,310,904 B2
(45) Date of Patent: *Nov. 13, 2012

(54) INFORMATION RECORDING APPARATUS AND INFORMATION RECORDING METHOD

(75) Inventor: Tomoaki Ryu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,549

(22) Filed: Feb. 15, 2012

(65) Prior Publication Data

US 2012/0147719 A1 Jun. 14, 2012

Related U.S. Application Data

(62) Division of application No. 12/937,205, filed as application No. PCT/JP2009/001736 on Apr. 15, 2009, now Pat. No. 8,139,451.

(30) Foreign Application Priority Data

Apr. 21, 2008 (JP) .................................. 2008-110108

(51) Int. Cl.
*G11B 7/00* (2006.01)

(52) U.S. Cl. .................... 369/30.05; 369/47.15; 709/203

(58) Field of Classification Search ............... 369/47.15, 369/30.04, 30.05, 84, 47.13, 47.22, 59.25, 369/59.23; 715/811, 825, 826; 707/999.102, 707/999.107, 999.001; 709/203, 213
See application file for complete search history.

(56) References Cited

U.S. PATENT DOCUMENTS

| 7,984,051 B2* | 7/2011 | Yoneyama ..................... 707/736 |
| 8,139,451 B2* | 3/2012 | Ryu ........................... 369/47.15 |
| 2004/0049771 A1* | 3/2004 | Yu ................................. 717/172 |
| 2004/0148269 A1* | 7/2004 | Wyllie .............................. 707/1 |
| 2005/0234858 A1* | 10/2005 | Torii et al. ......................... 707/1 |
| 2006/0126471 A1* | 6/2006 | Tomonari et al. ............ 369/53.2 |
| 2006/0280437 A1 | 12/2006 | Logan et al. |
| 2007/0189718 A1* | 8/2007 | Kobayashi et al. ............. 386/95 |
| 2007/0198582 A1* | 8/2007 | Yamamichi et al. ....... 707/104.1 |
| 2007/0220021 A1* | 9/2007 | Kato et al. .................... 707/100 |
| 2008/0134340 A1* | 6/2008 | Ueda et al. ..................... 726/26 |
| 2009/0031254 A1* | 1/2009 | Herpel et al. ................. 715/840 |
| 2009/0313621 A1 | 12/2009 | Dewa |

FOREIGN PATENT DOCUMENTS

| EP | 1 087 398 A1 | 3/2001 |
| EP | 1 239 376 A2 | 9/2002 |

(Continued)

*Primary Examiner* — Thang Tran
(74) *Attorney, Agent, or Firm* — Birch Stewart Kolasch & Birch, LLP

(57) ABSTRACT

An information recording apparatus for recording additional content on a medium on which a title including one or more files is already recorded, includes means for designating a title to be added on the medium; means for transmitting disc package information, the disc package information and unique IDs; means for receiving and additionally recording on the medium the title to be added generated in the content server, file names of files so as not to be the same as the file names of the files constituting the titles already recorded on the medium; means for receiving and additionally recording a new title for display of a menu screen on the medium, which is generated in the content server, so that the title to be added can be selected, on the basis of the disc package information; and means for receiving and additionally recording new disc package information on the medium.

2 Claims, 16 Drawing Sheets

FOREIGN PATENT DOCUMENTS

| | | |
|---|---|---|
| EP | 1 551 030 A1 | 7/2005 |
| EP | 1 873 784 A1 | 2/2008 |
| JP | 2002-369154 A | 12/2002 |
| JP | 2005-267577 A | 9/2005 |
| JP | 2007-512640 A | 5/2007 |
| JP | 2007-519145 A | 7/2007 |
| JP | 2007-257685 A | 10/2007 |
| JP | 2008-34076 A | 2/2008 |
| WO | WO 02/17618 A2 | 2/2002 |
| WO | WO 2004/079584 A1 | 9/2004 |
| WO | WO 2005/050652 A1 | 6/2005 |
| WO | WO 2005/069303 A1 | 7/2005 |
| WO | WO 2006/078121 A2 | 7/2006 |
| WO | WO 2008/001876 A1 | 1/2008 |

\* cited by examiner

FIG.2

STREAM 00001.strm
00002.strm
...
... } 11

STREAM IFO 00001.ifo
00002.ifo
...
... } 12

TITLE 00001.title
00002.title
...
... } 13

Program.cmd } 14

FIG.4

```
stream_info(){
    Start_PTS
    End_PTS
    num_of_audio
    num_of_graphics
    num_of_interactive
    for( j = 0 ; j < num_of_audio ; j++ ){
        packet_ID
    }
    for( k = 0 ; k < num_of_graphics ; k++ ){
        packet_ID
    }
    for( k = 0 ; k < num_of_interactive ; l++ ){
        packet_ID
    }
    entry_map(){
        num_of_entry
        for( n = 0 ; n < num_of_entry ; n++ ){
            entry_packet_num
            entry_PTS
        }
    }
}
```

FIG.6

```
title_info(){
    num_of_stream
    for( i = 0 ; i < num_of_stream ; i++ ){
        stream_name
        In_time
        Out_time
        Start_packet_num
        End_packet_num
        num_of_audio
        num_of_graphics
        num_of_interactive
        for( j = 0 ; j < num_of_audio ; j++ ){
            packet_ID
        }
        for( k = 0 ; k < num_of_graphics ; k++ ){
            packet_ID
        }
        for( k = 0 ; k < num_of_interactive ; l++ ){
            packet_ID
        }
    }
    num_of_sub_stream
    for( m = 0 ; m < num_of_stream ; m++ ){
        stream_name
        Sync_PTS
        num_of_audio
        num_of_graphics
        num_of_interactive
        for( n = 0 ; n < num_of_audio ; n++ ){
            packet_ID
        }
        for( p = 0 ; p < num_of_graphics ; p++ ){
            packet_ID
        }
        for( q = 0 ; q < num_of_interactive ; q++ ){
            packet_ID
        }
    }
}
```

FIG.7

```
program_cmd(){
    menu_title_file_name
    num_of_title
    for( i = 0 ; i < num_of_title ; i++ ){
        num_of_command
        for( j = 0 ; j < num_of_command ; j++ ){
            command()
        }
    }
}
```

FIG.8

STREAM 00001.strm
00002.strm
00003.strm

STREAM IFO 00001.ifo
00002.ifo
00003.ifo

TITLE 00001.title
00002.title
00003.title

Program.cmd

```
Package_info(){
    num_of_title
    for( i = 0 ; i < num_of_title ; i++ ){
        title_name
        title_identifier
        num_of_stream
        for( j = 0 ; j < num_of_stream ; j++ ){
            stream_name
        }
    }
}
```

FIG.17

```
Package_info(){
    num_of_title
    for( i = 0 ; i < num_of_title ; i++ ){
        title_name
        title_identifier
        num_of_stream
        for( j = 0 ; i < num_of_stream ; j++ ){
            stream_name
        }
        num_of_sub_stream
        for( k = 0 ; k < num_of_sub_stream ; k++ ){
            stream_name
            num_of_sub_audio
            num_of_sub_graphics
            num_of_sub_interactive
            for( l = 0 ; l < num_of_sub_audio ; l++ ){
                sub_audio_identifier
            }
            for( l = 0 ; m < num_of_sub_graphics ; m++ ){
                sub_graphics_identifier
            }
            for( l = 0 ; n < num_of_sub_interactive ; n++ ){
                sub_interactive_identifier
            }
        }
    }
}
```

INFORMATION RECORDING APPARATUS AND INFORMATION RECORDING METHOD

CROSS REFERENCE OF RELATED APPLICATIONS

This application is a Divisional of application Ser. No. 12/937,205 filed on Oct. 8, 2010 now U.S. Pat. No. 8,139,451, which is a National Phase of PCT International Application No. PCT/JP2009/001736 filed on Apr. 15, 2009, which claims the benefit of Japanese Application No. 2008-110108 filed in Japan, on Apr. 21, 2008. The entire contents of all of the above applications are hereby incorporated by reference.

FIELD OF THE INVENTION

The present invention relates to an information recording apparatus and information recording method for recording content supplied by a content server onto an optical disc or other recording medium.

BACKGROUND ART

Digital content is now being provided in an environment that is changing from physical media such as CD (compact disc) and DVD (digital versatile disc) media to data distribution through the Internet and other communication media. With this change, information recording and reproducing apparatus are becoming capable of more than just reproducing ordinary stamped movie packages; it is also possible to download and view digital content through the Internet. For example, in Patent document 1, digital content already present on a disc and digital content that has been downloaded from the Internet are linked and reproduced as single content.
Patent document 1: Japanese Patent Application Publication No. 2002-369154

DISCLOSURE OF THE INVENTION

Problems to be Solved by the Invention

Because interactive functions, switching of subtitles and sound, menu screen displays, etc. are required, a format intended for ROM packages is generally used as the format for downloading and recording movie content onto a disc in this way. The ROM package format was created on the assumption of stamping, so no consideration is given to the (additional) recording of further content onto a disc on which content has already been recorded. On the other hand, formats created on the assumption of additional recording lack BD (Blu-ray disc) pop-up menus and other interactive functions, and lack functions for displaying menu screens prerecorded on the disc, and are therefore unsuited for recording content such as movies. Another problem is that content recorded on a disc in a recording-type format cannot be reproduced by a reproduce-only device. The above constraints make it impossible to record new content on a disc on which downloaded content has already been recorded, even if there is adequate remaining recording space, which is inconvenient for users. The present invention provides an information recording and reproducing apparatus that solves the problems described above.

Means for Solution of the Problems

An information recording apparatus according to the present invention records additional content on a medium on which a title including a plurality of files is already recorded, the additional content being provided by a content server.

The information recording apparatus includes:
means for designating, to the content server, a title to be added;
means for transmitting disc package information to the content server, the disc package information including unique IDs for identifying the title already recorded on the medium and the files constituting the title;
means for receiving a title for display of a menu screen, including the title to be added, for the new disc package, control information describing commands needed to reproduce the titles in the new disc package, and new disc package information giving unique IDs for identifying the titles in the new disc package and the files constituting the titles, generated in the content server on the basis of the disc package information, together with the title to be added; and
means for additionally recording the information received from the content server on the medium.

EFFECT OF THE INVENTION

Because the information recording apparatus according to the present invention sends the content server disc package information giving unique IDs for identifying the titles already recorded on the medium and the files constituting the titles, on the basis of the disc package information, the content server can generate a title for display of a menu screen for a new disc package including the additionally recorded content. A new disc package including a menu display enabling the additional title to be selected and reproduced can be obtained by receiving and recording the title for display of the menu screen generated by the content server. The additional recording of the title is carried out in a ROM-compliant data format, so compatibility with reproduce-only devices can be maintained. Content can be added as long as free space is available on the recording medium, so the recording medium can be used effectively.

BRIEF DESCRIPTION OF THE DRAWINGS

FIG. 2 is a drawing showing the file structure of an optical disc according to the first and second embodiments of the invention.

FIG. 4 shows the syntax of a stream information file in the first and second embodiments of the invention.

FIG. 6 shows the syntax of a title file in the first and second embodiments of the invention.

FIG. 7 shows the syntax of a program file in the first and second embodiments of the invention.

FIG. 8 shows the file structure in an optical disc in the first embodiment of the invention.

FIG. 17 shows the syntax of the disc package information file in the second embodiment of the invention.

Figure 1:
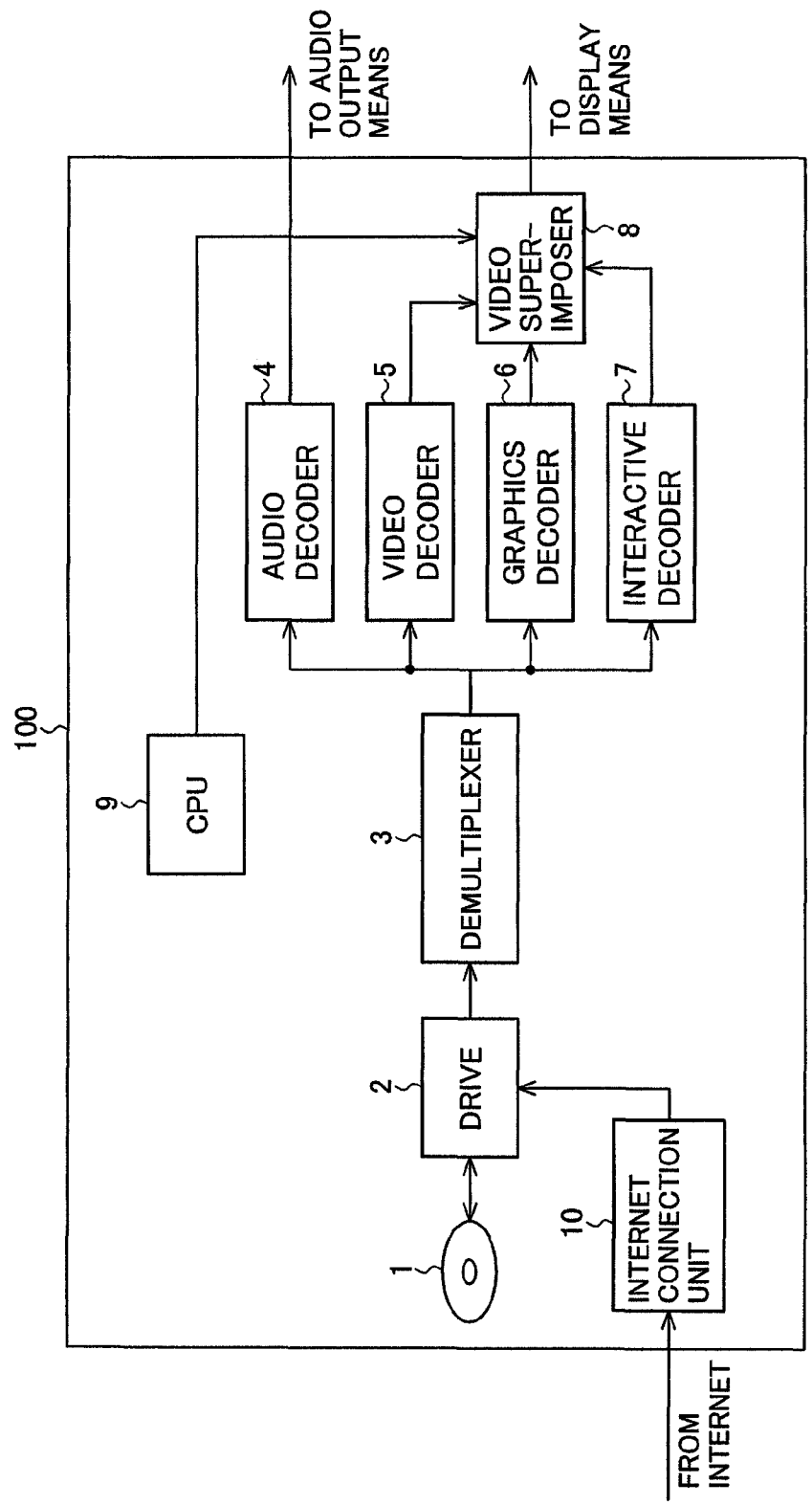
FIG. 1 is a block diagram showing the general structure of an information recording and reproducing apparatus according to a first embodiment and a second embodiment of the present invention.

EXPLANATION OF REFERENCE CHARACTERS 1 optical disc, 2 drive, 8 video superimposer, 9 CPU

BEST MODE FOR CARRYING OUT THE INVENTION

First Embodiment

FIG. 1 is a block diagram showing the structure of the information recording and reproducing apparatus 100 in the first embodiment. Reference numeral 1 in FIG. 1 denotes a recordable and reproducible optical disc on which certain data (for example, control data needed for control of the information recording and reproducing apparatus 100, movie or music data, and so on) are recorded, and 2 denotes a drive that reproduces data from the optical disc 1 and records data on the optical disc 1. Reference numeral 3 denotes a demultiplexer that separates the data read by the drive 2 into video data, audio data, graphics data, and interactive data, 4 denotes an audio decoder that demodulates (hereinafter, decodes) the audio data, 5 denotes a video decoder that decodes the video data, 6 denotes a graphic decoder that decodes the graphics data, 7 denotes an interactive decoder that decodes the interactive data, and 8 denotes a video superimposer that overlays images obtained by decoding graphics data or interactive data and video created by the CPU 9 on the video obtained by decoding the video data. Reference numeral 9 denotes the CPU that controls the above elements by sending control commands to these elements, monitoring the status of the elements, etc. Reference numeral 10 denotes an internet connection unit that connects to an external internet and sends and receives information. Signals such as the control signals output from the CPU 9 are omitted in FIG. 1.

Next the reproducing operation will be described.

The drive 2 in FIG. 1 reads data recorded on the optical disc 1 and outputs the data to the demultiplexer 3. The data output from the drive 2 include video data representing images (hereinafter, video) recorded on the optical disc 1, audio data representing sound corresponding to the video data, graphics data representing images (hereinafter, graphics) overlaid on the video images represented by the video data, and interactive data including button data representing images (hereinafter, buttons) by which the user makes button selections on the screen and control programs executed when the buttons are selected, multiplexed as packets.

The demultiplexer 3 separates the input data into video data, audio data, graphics data, and interactive data. The audio data are output to the audio decoder 4, the video data to the video decoder 5, the graphics data to the graphics decoder 6, and the interactive data to the interactive decoder 7. The demultiplexer 3 performs this separation according to identifiers placed at the head of each packet of data.

The audio decoder 4 decodes the input audio data and outputs the decoded data to an audio output means (not shown). The video decoder 5 decodes the input video data and outputs the decoded data to the video superimposer 8. The graphics decoder 6 decodes the input graphics data and outputs the decoded data to the video superimposer 8. The interactive decoder 7 decodes the input interactive data, outputs the button graphics to the video superimposer 8, and outputs the control programs to the CPU 9.

The video superimposer 8 overlays the graphics obtained by decoding of the graphics data in the graphics decoder 6 and the graphics obtained by decoding of the button data in the interactive data in the interactive decoder 7 on the video obtained by decoding of the video data in the video decoder 5, and outputs the superimposed data to a display means (not shown).

FIG. 2 shows the file structure of a disc package of the content recorded on the optical disc 1. Reference numeral 11 denotes presentation files in which video data, audio data, graphics data, and interactive data are multiplexed; "STREAM" is the name of a folder in which the presentation files 11 are stored. Reference numeral 12 denotes stream information files describing the data structure of the presentation files 11; "STREAM_IFO" is the name of a folder in which the stream information files 12 are stored. The presentation files 11 and stream information files 12 are in one-to-one correspondence. Reference numeral 13 denotes title files describing the structure of titles; "TITLE" is the name of a folder in which the title files 13 are stored. Reference numeral 14 denotes a program file including commands needed for reproducing the title files.

Figure 3:
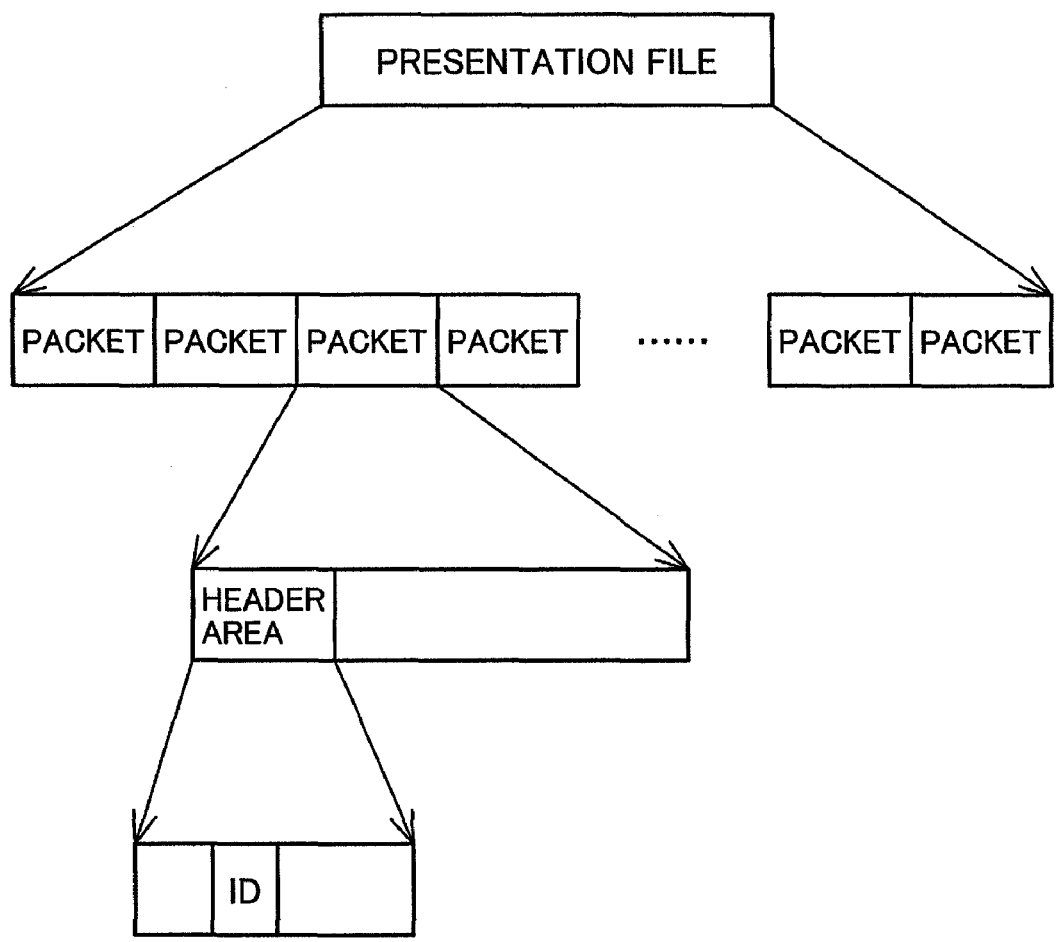
FIG. 3 is a diagram of the structure of a stream, showing the structure of a presentation file in the first and second embodiments of the invention.

FIG. 3 is a stream configuration drawing showing the structure of a presentation file 11. A stream is made up of fixed-length data units referred to as packets. After the video data, audio data, graphics data, and interactive data are divided into these packet units, they are multiplexed to form a stream. There is a header area at the beginning of each packet; the data in the packet are recognized according to an ID (identification) given in the header. The demultiplexer 3 separates video data, audio data, graphics data, and interactive data by recognizing these IDs.

FIG. 4 shows the syntax of a stream information file 12. "Start_PTS" indicates the PTS (Presentation_Time Stamp) of the first video frame in the relevant presentation file 11, and "End_PTS" indicates the PTS of the last video frame. "num_of_audio", "num_of_graphics", and "num_of_interactive" indicate the quantities of audio data, graphics data, and interactive data multiplexed in the presentation file 11. The following three loop statements (starting with "for") are repeated "num_of_audio", "num_of_graphics", and "num_of_interactive" times; the "packet_ID" entries give the IDs of the packets assigned to the respective streams. Information necessary for random access reproduction is given in "entry_map". If the video data are encoded according to MPEG-2, the start of a GOP (group of pictures) is equivalent to an entry point. In this embodiment, this item indicates which of the packets in the presentation file 11 are the locations of the start of a GOP. "num_of_entry" is the total number of entry points, "entry_packet_num" is the relative number of packets from the start of the presentation file 11 to the start of the GOP, and "entry_PTS" is the PTS of the start of the GOP. Because the packets have a fixed length, the relative number of bytes from the start of the file to the start of the GOP can be calculated by multiplying the value of "entry_packet_num" by the number of bytes per packet. The information recording and reproducing apparatus 100 finds the entry time from "entry_PTS", then calculates the position of the entry point on the disc from the corresponding "entry_packet_num" and starts reproduction from there.

Figure 5:
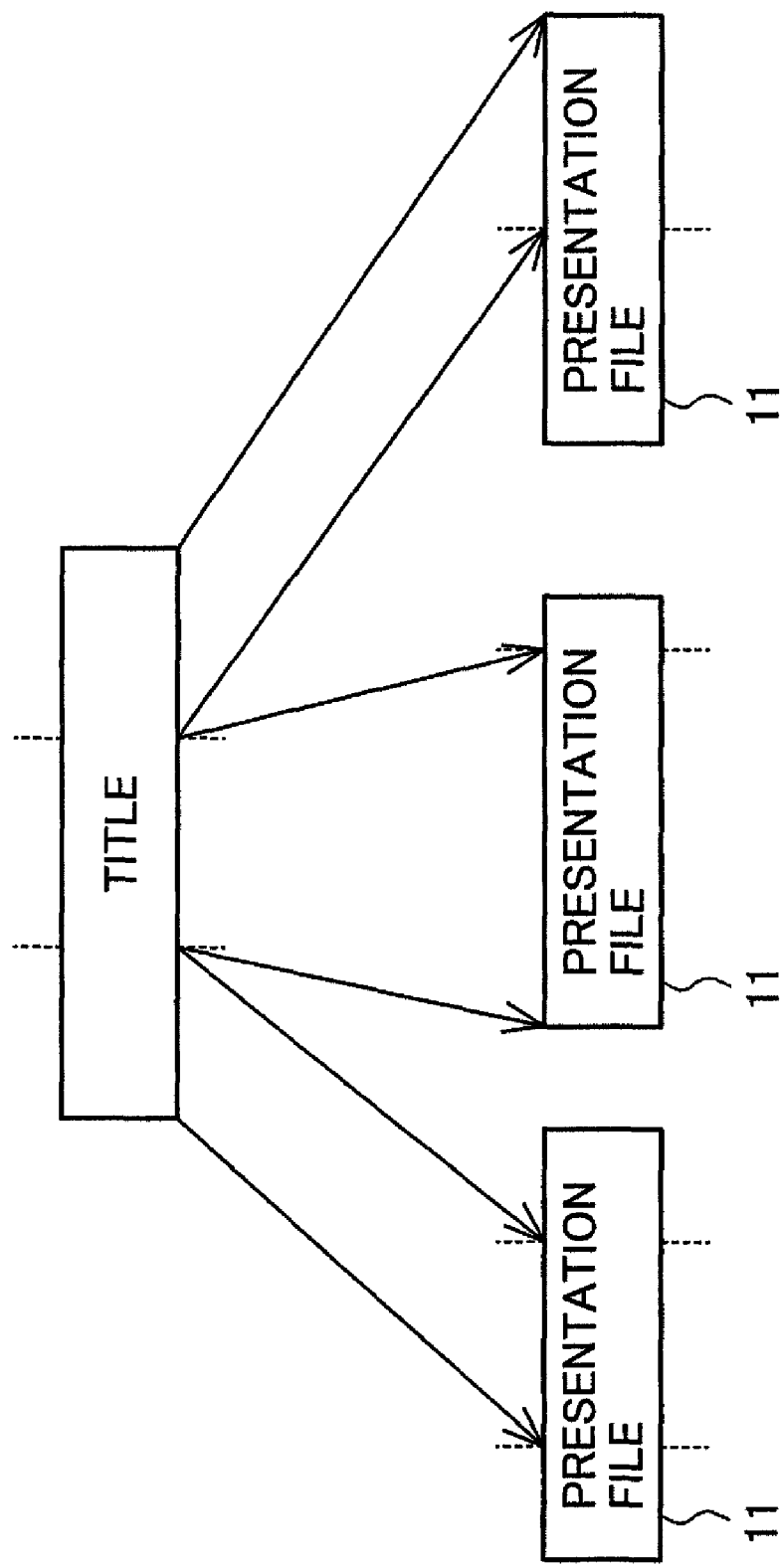
FIG. 5 is a diagram of the structure of a title file in the first and second embodiments of the invention.

FIG. 5 shows the structure of a title. A title is a collection of certain intervals in one or more presentation files 11, and may consist of various sets, such as a plurality of intervals in a single presentation file 11 or a certain interval in each of a plurality of presentation files 11.

FIG. 6 shows the syntax of a title file 13. "num_of_stream" is the total number of presentation files 11 constituting the title; the loop statement that follows is repeated "num_of_stream" times. A title is made up of certain intervals in one or more presentation files 11; "stream_name" is the file name of the presentation file 11 to be reproduced; "In_time" and "Out_time" indicate the reproduction starting time and ending time of the interval to be reproduced in the presentation file 11. In this embodiment the PTS (Presentation Time Stamp) of the video data is used as "In_time" and "Out_time". "Start_packet_num" and "End_packet_num" indicate relative numbers of packets from the start of the presentation file 11 to the video frames designated by "In_time" and "Out_time". From this information, the information recording and reproducing apparatus 100 can determine what part of the presentation file 11 to reproduce. "num_of_audio", "num_of_graphics", and "num_of_interactive" indicate the number of video, audio, and interactive items to be used in reproduction. There are similar parameters in the stream information file 12, but whereas the parameters in the stream information file 12 indicate the total number of video, audio, and interactive items in the presentation file 11, the parameters in the title file 13 differ by indicating the total number of video, audio, and interactive items in the presentation file 11 that are used in reproduction. The three following loop statements will not be described because they are similar to the loop statements described in FIG. 4. "num_of_sub_stream" is the total number of presentation files 11 reproduced together with the stream including the video. "sub_stream_name" is the total number of presentation files 11 reproduced together with the main stream. "Sync_PTS" is the time at which reproduction synchronized with the main stream begins. The rest is similar to the main stream, so a description will be omitted.

FIG. 7 shows the syntax of a program file 14. "menu_title_file_name" is the name of a title file that displays the menu displayed when the user presses the menu key. "num_of_title" indicates the total number of programs; the following loop statement is repeated "num_of_title" times. "num_of_command" indicates the total number of programs (commands); the following loop statement is repeated "num_of_command" times.

Next the procedure by which the content of the optical disc 1 is reproduced will be described. FIG. 8 shows an example of the file structure in the optical disc 1. In the syntax shown in FIG. 6, the "num_of_stream" in each of "00001.title", "00002.title", and "00003.title" is set to "1", and the assigned "stream name" is "00001.strm", "00002.strm", "00003.strm", respectively. "0001.title" is assigned as the "menu_title_file_name" in "Program.cmd".

Figure 9:
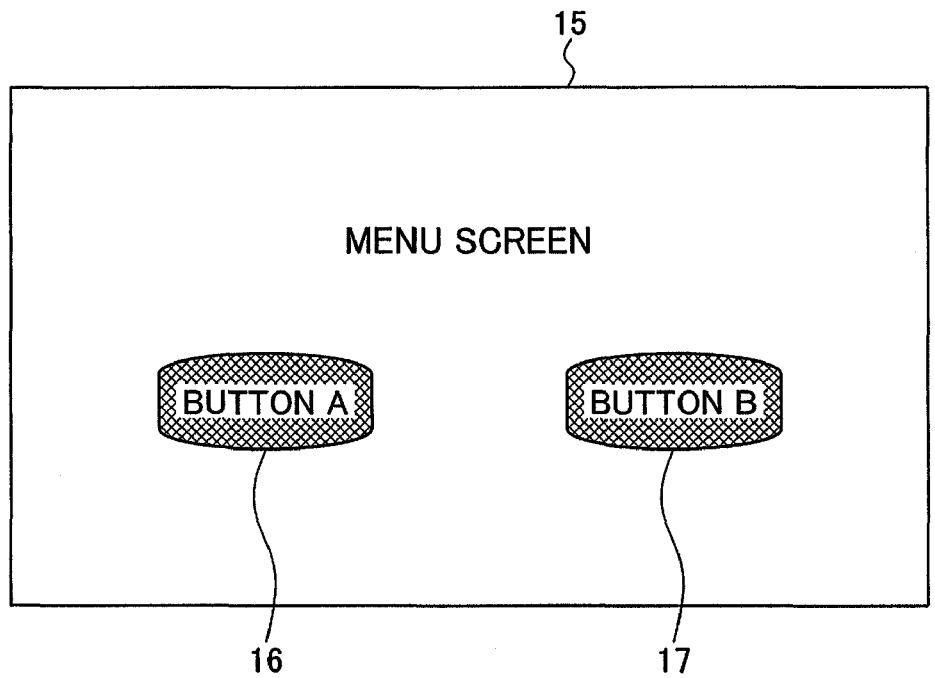
FIG. 9 shows a menu screen in the first embodiment of the invention.

FIG. 9 is the menu screen 15 displayed upon reproduction of an optical disc 1 on which the files shown in FIG. 8 are recorded. "00001.title" is associated with "00001.strm" as the files for displaying the menu screen. A command for reproducing "00002.title" is associated with button A 16 and a command for reproducing "00003.title" is associated with button B 17. Button A 16 and button B 17 are created from button data included in interactive data and the background video image is created from video data.

When this optical disc 1 is reproduced by the information recording and reproducing apparatus 100, first the reading of "00001.title" and "00001.strm", which are related to the display of the menu screen 15, begins. The data that are read are separated by the demultiplexer 3 according to the packet IDs specified in "0001.title", and only the necessary data are sent to the audio decoder 4, video decoder 5, graphics decoder 6, and interactive decoder 7. The images decoded by the video decoder 5 are combined with the images decoded by the graphics decoder 6 and the images decoded by the interactive decoder 7 in the video superimposer 8 and output.

If the user selects button A 16, "00002.title" is selected, and the corresponding "00002.strm" is read from the optical disc 1 and reproduced. If button B 17 is selected, "00003.title" is selected, and the corresponding "00003.strm" is read from the optical disc 1 and reproduced. When the user has selected a title and reproduction of the selected title has been completed, the CPU 9 reads a command corresponding to the reproduced title from "Program.cmd" and executes it. If, for example, the command specifies a return to the menu, the files associated with display of the menu screen are read and the menu screen is displayed. If the command specifies the reproduction of another title, the files associated with that title are read and the title is reproduced.

The procedure for recording content downloaded from the Internet on the optical disc 1 in the format above will be described below.

Figure 10:
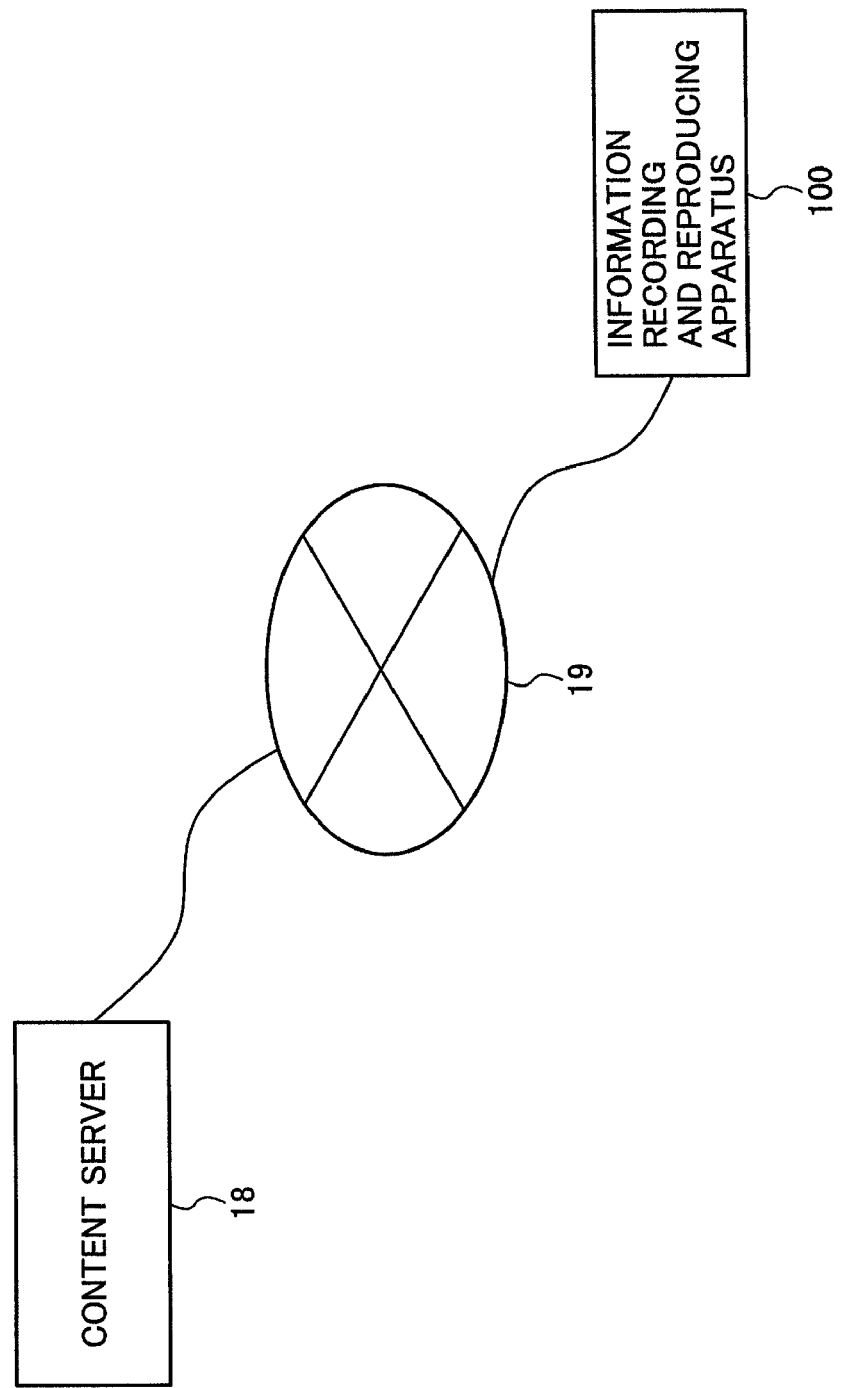
FIG. 10 shows the overall content downloading system in the first and second embodiments of the invention.

FIG. 10 shows the overall content downloading system. Reference numeral 19 in FIG. 10 denotes an Internet connection, 18 denotes a content server connected via the Internet connection, and 100 denotes the overall information recording and reproducing apparatus shown in FIG. 1. The internet connection unit 10 in FIG. 1 is linked to the Internet connection 19. The CPU 9 receives data for display of a Web browser from the content server through the internet connection unit 10, creates graphics according to the data, outputs the graphics to the video superimposer 8, uploads data recorded on the optical disc 1 to the content server 18 connected to the Internet connection, downloads data in the content server 18 to the information recording and reproducing apparatus 100, and performs various other processing.

Figure 11:
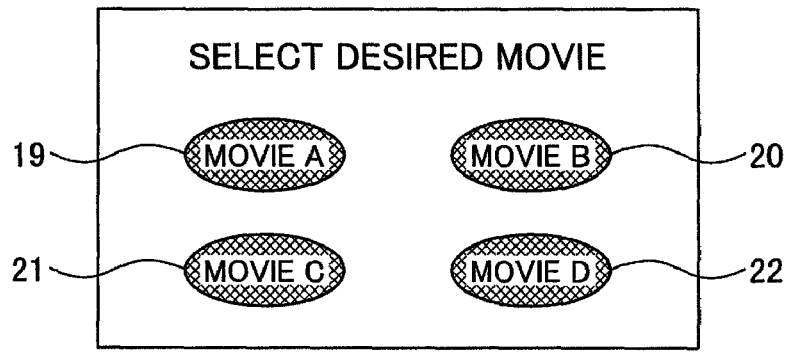
FIG. 11 is a drawing of a selection screen by which the user selects a title to download in the first embodiment of the invention.

FIG. 11 shows a guidance screen that is constructed by the processing, in the CPU 9 and video superimposer 8, of data transmitted from the content server 18 connected via the Internet 19, and is displayed by a Web browser. When the user, following this guidance screen, selects content to be additionally recorded, the corresponding data are downloaded and the new content is added to the optical disc 1. Buttons 19-22 show a list of titles that the user can select; here there are four selectable titles. To select movie A and movie C, the user uses an interface (not shown) to designate buttons 19 and 21. When buttons 19 and 21 are designated, but content server 18 constructs a disc package including movie A and movie C as titles.

Figure 12:
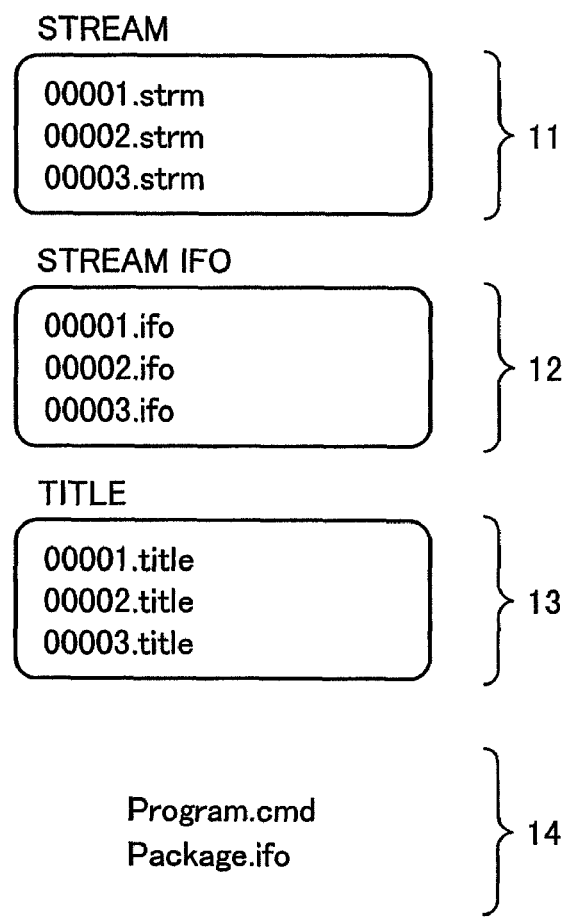
FIG. 12 shows the file structure of a disc package constructed by the content server in the first embodiment of the invention.
Figures 13, 14:
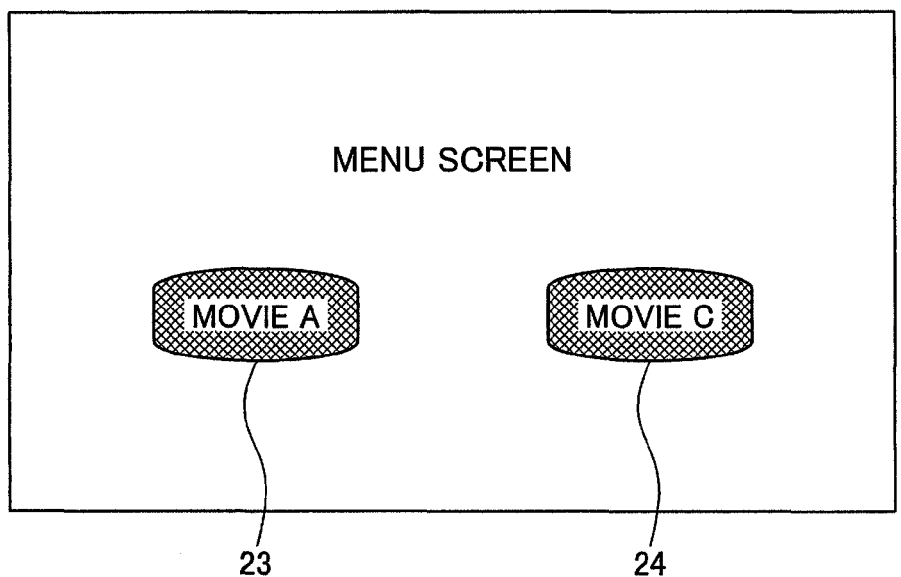
FIG. 13 is a menu screen displayed by the disc package constructed by the content server in the first embodiment of the invention.
FIG. 14 shows the syntax of the disc package information file in the first embodiment of the invention.

FIG. 12 shows the file structure of the disc package constructed in the content server 18. The title files 13 include "00001.title", which is a menu title, "00002.title", which corresponds to movie A, and "00003.title", which corresponds to movie C. The presentation files 11 include "00001.strm" corresponding to "00001.title", "00002.strm" corresponding to "00002.title", and "00003.strm" corresponding to "00003.title". The stream information files 12 include three files "00001.ifo", "00002.ifo", "00003.ifo" corresponding to "00001.strm", "00002.strm", and "00003.strm". The program files 14 include a disc package information file "Package.ifo", described below, in addition to "Program.cmd". FIG. 13 is a menu screen for the disc package including movie A and movie B that has been constructed by the content server 18. Movie A is reproduced if button 23 is selected, and movie C is reproduced if button 24 is selected. When the construction of the disc package information file is completed in the content server 18, the information recording and reproducing apparatus 100 downloads the disc package information file and writes it on the optical disc 1.

Next the procedure for adding a new title (movie D) to the optical disc 1 on which movie A and movie C have been recorded as explained above will be described. As already noted, a title for display of a menu screen is included in the disc package, so when movie D is added, a title for a new menu screen including the additional movie D must be constructed. For this purpose, it is necessary to have means by which information about the titles already recorded on the optical disc 1 can be known at the content server 18.

FIG. 14 shows the syntax of the disc package information file "Package.ifo" shown in FIG. 12. "num_of_title" is the total number of titles recorded on the optical disc. The following "for" loop is iterated "num_of_title" times. "title_name" indicates the file name of a title, and "title_identifier" is the unique ID of the title. This unique ID may be a series of numbers identifying the title from a title list in the server, or text information giving the name of the title directly. "num_of_stream" is the number of stream files constituting the title; the following "for" loop is repeated "num_of_stream" times. "stream name" indicates the file name of a stream. Sending the disc package information file to the content server 18 enables the content server 18 to recognize information about the titles already recorded on the optical disc 1 on which the new title is to be recorded.

Figure 15:
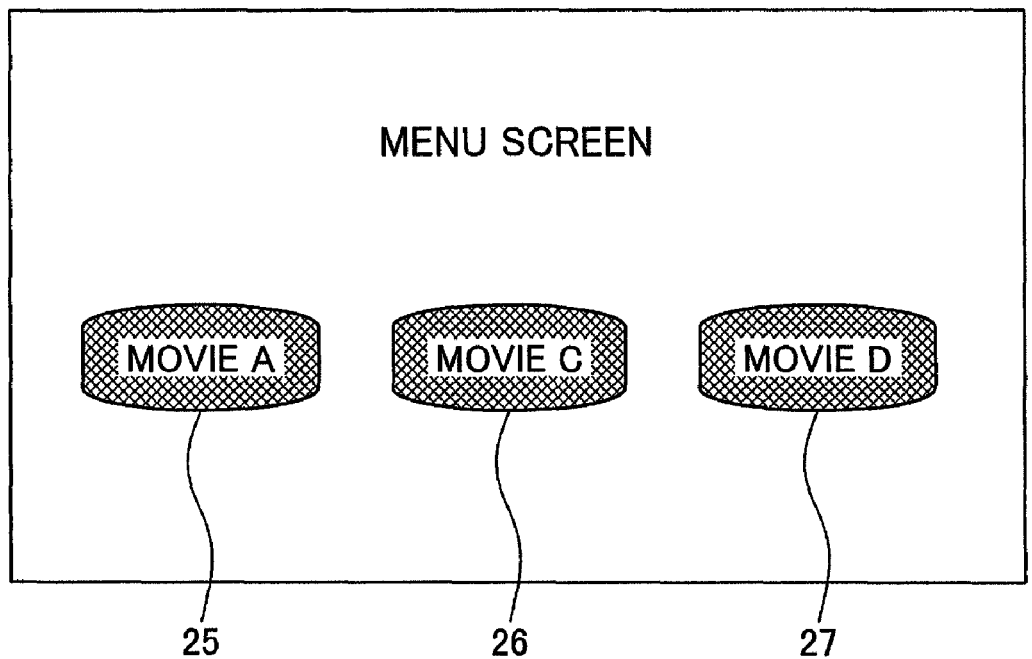
FIG. 15 shows a menu displayed by a disc package to which a title has been added in the first embodiment of the invention.

When the user selects movie D on the guidance screen in FIG. 11, the information recording and reproducing apparatus 100 is asked by the content server 18 to upload a disc package information file. The information recording and reproducing apparatus 100 uploads the disc package information file in accordance with this request. The content server 18 learns from the "title_identifier" items in the disc package information file that movie A and movie C are already recorded on the optical disc 1, and constructs a title for the display of a new menu screen including movie A, movie C, and the additional title (movie D) as in FIG. 15.

Figure 16:
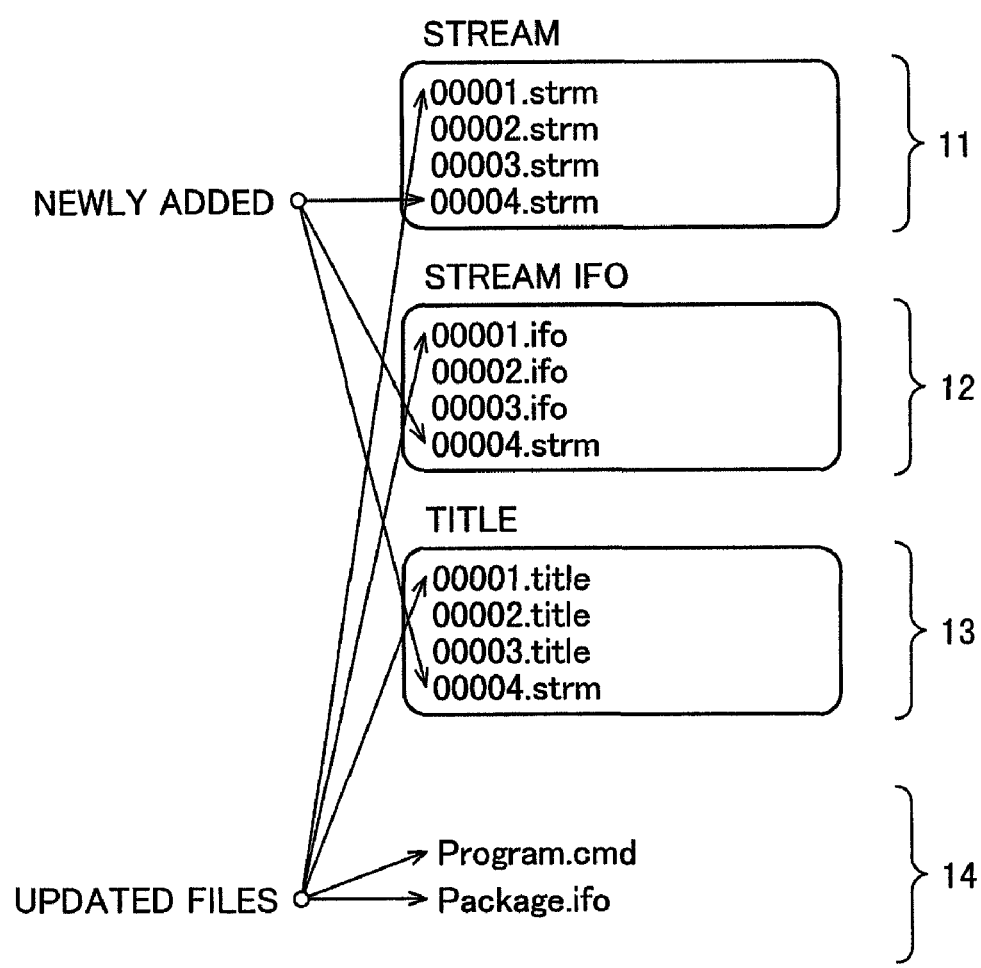
FIG. 16 is a diagram of the structure of a disc package to which a title has been added in the first embodiment of the invention.

FIG. 16 shows the structure of the disc package constructed in the content server 18 when movie D is selected as content to be added to an optical disc 1 on which movie A and movie C have already been recorded. From the "title_identifier", "title_name", and "stream_name" in the disc package information file "Package.ifo" the menu screen title of the optical disc 1 is seen to include "00001.strm", "00001.ifo", and "00001.title". The new menu screen title is configured by updating the files "00001.strm", "00001.ifo", and "00001.title". Similarly, it can be seen from the disc package information file that files 00001 to 00003 are already in use on the optical disc 1, so the file names "00004.strm", "00004.ifo", and "00004.title", which are not used yet, are assigned to movie D. The files constituting movie A and the files constituting movie C, which are already recorded on the optical disc 1, are assigned their existing file names. The two files "Program.cmd" and "Package.ifo" are newly updated in order to add the new title. When the new disc package has been constructed at the content server 18, downloading to the information recording and reproducing apparatus 100 begins. The downloaded files are the files constituting movie D, the files constituting the title for menu screen display, and "Program.cmd" and "Package.ifo". The information recording and reproducing apparatus 100 overwrites the files "00001.strm", "00001.ifo", and "00001.title" constituting the title for menu screen display, and newly writes the files "00004.strm", "00004.ifo", and "00004.title" constituting movie D. The newly configured "Program.cmd" and "Package.ifo" are also overwritten. A disc package including movie A, movie C, and movie D is recorded on the optical disc 1 by the above procedure.

As described above, disc package information indicating the title information already recorded on the optical disc 1 is provided in the program files 14; this information is transmitted to the content server 18, so that the content server 18 can recognize the title information already recorded on the optical disc 1, and if a new title is to be added, can construct a disc package having a title for display of a new menu screen that includes the additional title. A disc package that permits all the movie titles, including movie A, movie C, and movie D, to be selected from the menu screen and reproduced can be obtained by downloading the data of the title for display the new menu screen and the title being added from the content server 18 and recording the data on the optical disc 1. The additional recording of titles is carried out in a ROM-compliant data format, so compatibility with reproduce-only devices can be maintained. Content can be added as long as free space is available on the recording medium, so the recording medium can be used effectively.

Second Embodiment

The adding of a new title was described in the first embodiment, but the adding of part of a title, instead of an entire title, is also contemplated. Exemplary cases are the later addition of new audio or subtitle content to a single title. In the second embodiment, a method of updating part of a title will be described.

FIG. 17 shows the syntax of a disc package information file used to update part of a title. Differing from the disc package information file shown in FIG. 14, loop statements for recognition of the audio data, graphics data, and interactive data present in the presentation file 11 are added below "num_of_sub_stream". "num_of_sub_stream" is the total number of substreams included in the title; the following loop statement is repeated "num_of_sub_stream" times. "num_of_sub_audio", "num_of_sub_graphics", and "num_of_sub_interactive" are the total number of audio data, graphics data, and interactive data items present in the presentation file 11. The following three loop statements are repeated "num_of_sub_audio", "num_of_sub_graphics", and "num_of_sub_interactive" times. "sub_audio_identifier", "sub_graphics_identifier", and "sub_interactive_identifier" are unique IDs expressing the content of the audio data, graphics data, and interactive data.

Figure 18:
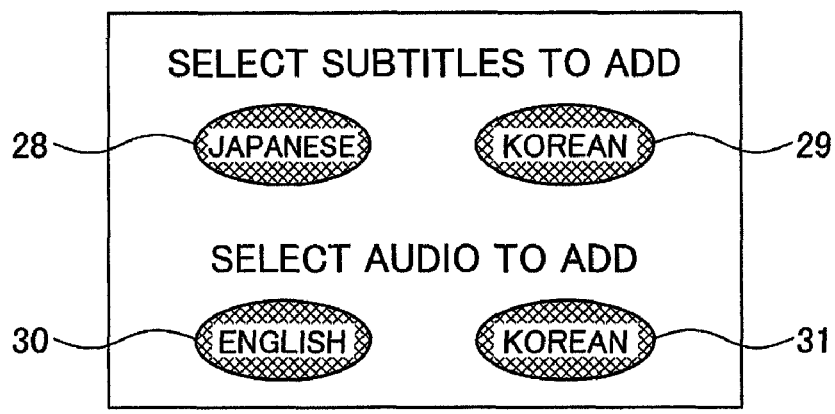
FIG. 18 is a drawing of a selection screen by which the user selects audio and subtitles to download in the second embodiment of the invention.

FIG. 18 is the guidance screen configured by processing, in the CPU 9 and video superimposer 8, of the data transmitted from the content server connected via the Internet connection. Following the guidance on this screen, the user performs operations to select the audio or subtitles that the user himself or herself wants to add, download the data, and record the data on the optical disc 1. In FIG. 18, the user can select graphics data for Japanese or Korean subtitles with buttons 28 and 29, and audio data for an English or Korean soundtrack with buttons 30 and 31.

Figure 19:
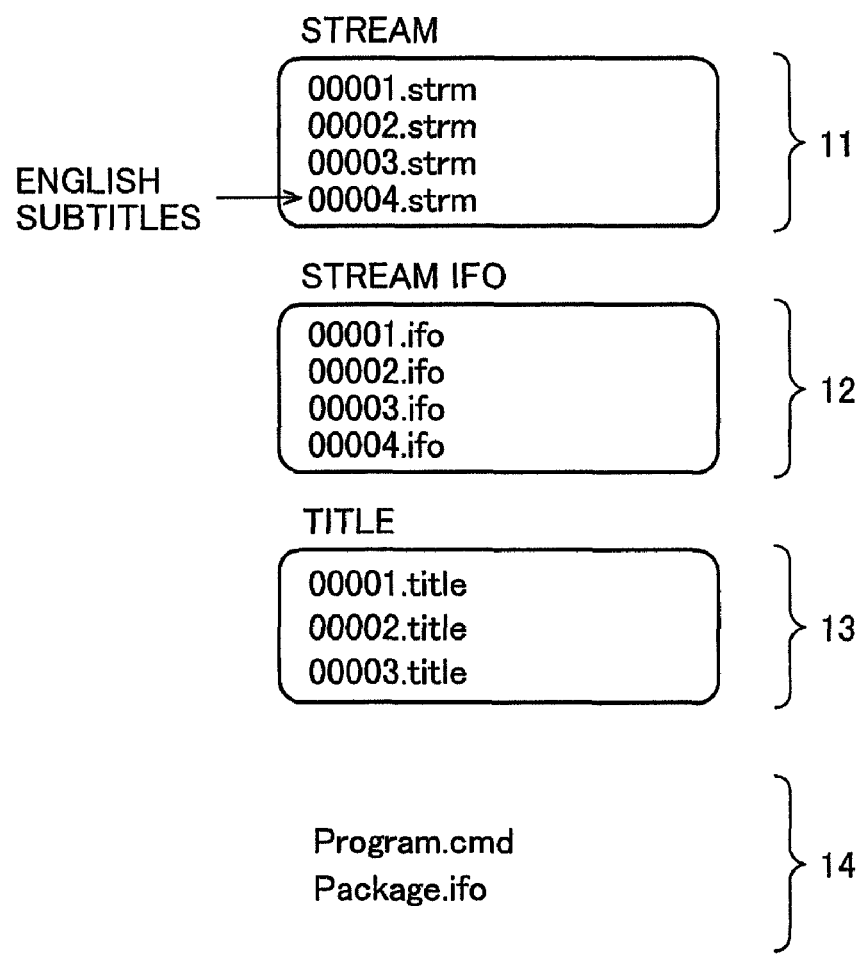
FIG. 19 is a diagram of the structure of a disc package recorded on an optical disc in the second embodiment of the invention.

FIG. 19 shows the file structure of the disc package already recorded on the optical disc 1. This disc package includes two movie titles (movie A and movie B), and movie A has a graphics data substream for display of subtitles. Japanese audio is multiplexed into the main stream of movie A, without subtitles. The subtitles overlaid on movie A are in English. In the presentation files 11 in FIG. 19, "00001.strm" is the file of a title for menu display, "00002.strm" is the file for movie A, "00003. strm" is the file for movie B, and "00004.strm" is a graphics file for display of subtitles overlaid on movie A. In the stream information files 12, "00004.ifo" is the file corresponding to "0004.strm". In the title files 13, "00001.title" corresponds to the menu screen title, "0002.title" to the movie A title, and "00003.title" to the movie B title. Except for "00004.strm" and "00004.ifo", the title and file relationships are as in the first embodiment (FIG. 12). In the disc package information file "Package.ifo" in the program files 14, a "sub_audio_identifier" and "sub_graphics_identifier" indicate that Japanese audio is present in the main stream file "00002.strm" of movie A, and English subtitles are present in the sub stream file "00004.strm".

Figure 20:
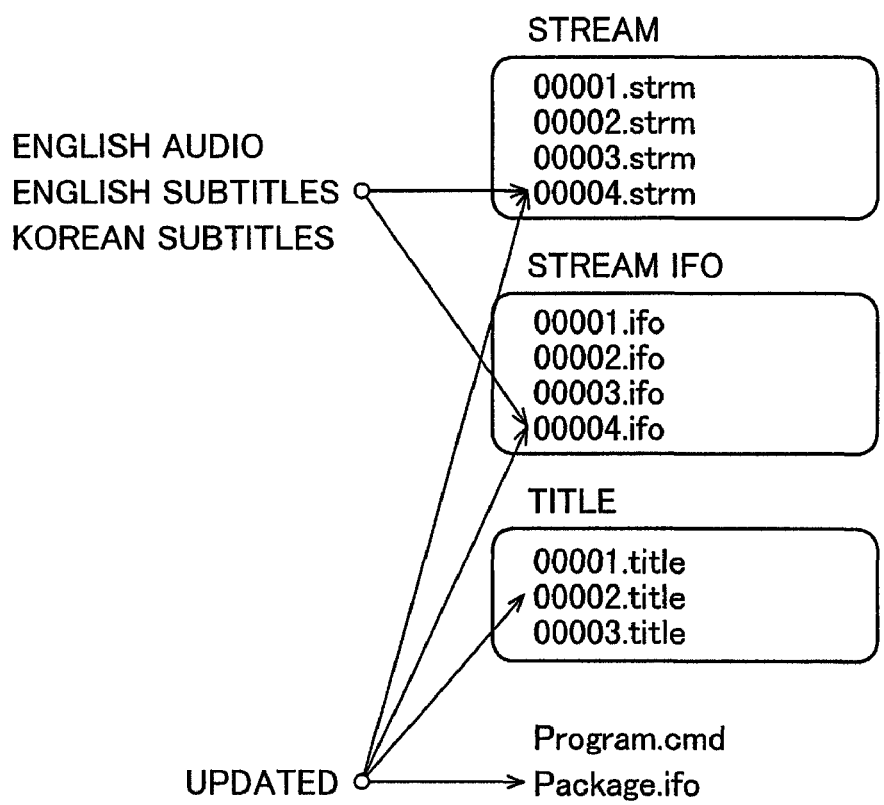
FIG. 20 is a diagram of the structure of a disc package constructed by the content server in the second embodiment of the invention.

The procedure when the user selects Korean subtitles and English audio for movie A on the guidance screen in FIG. 18 will now be described. When the user selects Korean subtitles with button 29 and English audio with button 30, a request for the uploading of a disc package information file is made from the content server 18 to the information recording and reproducing apparatus 100. Obeying this request, the information recording and reproducing apparatus 100 uploads the disc package information file. From the disc package information file, the content server 18 sees that there is already one sub stream for title 1, that Japanese audio is present in "00002.strm", and that English subtitles are present in "00004.strm". When the audio or subtitles the user is attempting to download are already present on the optical disc 1, the user is advised that downloading is not necessary and downloading is not executed. After it has been confirmed that the sub stream to be added is new, the content server 18 constructs a new disc package. First it constructs a sub stream in which the graphics data for the Korean subtitles and the audio data for the English soundtrack, which are to be newly added, are multiplexed together with the graphics data of the English subtitles already present as a sub stream of movie A. The newly constructed sub stream is recorded by updating the sub stream presentation file "00004.strm" and stream information file "00004.ifo" already present on the optical disc 1. Next, since new graphics data and audio data have been added, the title file "00002.title" of movie A is updated. The disc package information file "Package.ifo" is similarly updated. FIG. 20 shows the configuration of the disc package constructed at the content server 18.

When the new disc package has been constructed by the content server 18, the downloading of files to the information recording and reproducing apparatus 100 begins. The downloaded files are the four newly updated files: "00004.strm", "00004.ifo", "00002.title", and "Package.ifo". Since the only changes are the addition of audio and subtitles to movie A, no updates are carried out for the menu screen and movie B.

In the second embodiment, it is possible to add only audio or only subtitles by adding a "sub_audio_identifier", "sub_graphics_identifier", and "sub_interactive_identifier", which are information identifying audio data, graphics data, and interactive data included in the title, to the disc package information file.

What is claimed is:

1. An information recording apparatus for recording additional content on a medium on which a title including one or more files is already recorded, the additional content being provided by a content server, the information recording apparatus comprising:
    means for designating, to the content server, a title to be added on the medium;
    means for transmitting disc package information, which is read from the medium, to the content server, the read disc package information including a unique ID to be used by the content server for identifying all titles already recorded on the medium;
    means for receiving and additionally recording on the medium the title to be added generated in the content server, file names of files constituting the title to be added being defined in the title to be added, on the basis of the disc package information, so as not to be the same as the file names of the files constituting the titles already recorded on the medium;
    means for receiving and additionally recording a button of a menu screen for display of the menu screen generated in the content server so that the title to be added can be selected on the basis of the disc package information; and
    means for receiving and additionally recording new disc package information on the medium,
    wherein the new disc package information identifies the title to be added generated in the content server and the button of the menu screen for display of the menu screen generated in the content server, and provides file name information of each file in the title to be added.

2. A method implemented in an information recording apparatus for recording additional content on a medium on which one or more titles each including one or more files are already recorded, the additional content being provided by a content server, the method comprising:
    transmitting to the content server a designation of a title to be added to the medium;
    reading from the medium disc package information, and transmitting the read disc package information to the content server, the read disc package information including a unique ID identifying to the content server all titles already recorded on the medium;
    receiving the title to be added from the content server, the title to be added comprising files whose file names are defined on the basis of the read disc package information so as not to be the same as the file names of the files constituting the titles already recorded on the medium;
    receiving from the content server a button of a menu screen to be displayed so that the title to be added can be selected in addition to the files already recorded on the medium;
    receiving from the content server new disc package information, which identifies the title to be added and the button of the menu screen, and provides file name information of each file in the title to be added; and
    recording the title to be added, the button of the menu screen, and the new disc package information on the medium in addition to the titles, the menu screen, and the disc package information already recorded on the medium.

* * * * *